United States Patent
Ito

(10) Patent No.: US 10,197,760 B2
(45) Date of Patent: Feb. 5, 2019

(54) OPTICAL LENS, LENS UNIT, IMAGING MODULE, ELECTRONIC APPARATUS, INJECTION MOLDING MOLD, AND INJECTION MOLDING METHOD

(71) Applicant: FUJIFILM Corporation, Tokyo (JP)

(72) Inventor: Hidekane Ito, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 94 days.

(21) Appl. No.: 15/257,484

(22) Filed: Sep. 6, 2016

(65) Prior Publication Data

US 2016/0370556 A1 Dec. 22, 2016

Related U.S. Application Data

(63) Continuation of application No. PCT/JP2015/051331, filed on Jan. 20, 2015.

(30) Foreign Application Priority Data

Mar. 17, 2014 (JP) .................................. 2014-053322

(51) Int. Cl.
  *G02B 7/02* (2006.01)
  *G02B 13/00* (2006.01)
  (Continued)

(52) U.S. Cl.
  CPC .......... *G02B 7/022* (2013.01); *B29C 45/2708* (2013.01); *B29D 11/0048* (2013.01);
  (Continued)

(58) Field of Classification Search
  CPC .... G02B 7/022; G02B 7/021; G02B 13/0045; B29C 45/2708; B29D 11/00403; B29D 11/0048; B29D 11/00519
  (Continued)

(56) References Cited

U.S. PATENT DOCUMENTS 9,164,253 B2 * 10/2015 Koike ............... B29D 11/00432
2006/0017836 A1 * 1/2006 Nuno ..................... G02B 7/021
  348/360

(Continued)

FOREIGN PATENT DOCUMENTS

JP 2007-245685 A 9/2007
JP 2010-014983 A 1/2010
(Continued)

OTHER PUBLICATIONS

Chinese Office Action and Search Report, dated Mar. 20, 2017, for Chinese Application No. 201580012487.8, with an English translation of the Chinese Office Action.
(Continued)

*Primary Examiner* — James R Greece
(74) *Attorney, Agent, or Firm* — Birch, Stewart, Kolasch & Birch, LLP

(57) ABSTRACT

An optical lens has an optical function portion having an optical function, and a flange portion formed around the optical function portion. The flange portion has a cut section, which is formed by cutting a gate portion, on a side surface thereof. In a case where the following are viewed from a direction of the optical axis of the optical lens, a concave portion is provided in at least a portion of a region in which the flange portion overlaps with a region obtained by straight lines connecting together an optical axis center of the optical lens and both ends of the cut section, and the concave portion is provided on both surfaces of the flange portion.

18 Claims, 18 Drawing Sheets

(51) Int. Cl.
 *B29C 45/27* (2006.01)
 *B29D 11/00* (2006.01)
 B29L 11/00 (2006.01)
 B29C 45/38 (2006.01)

(52) U.S. Cl.
 CPC .. *B29D 11/00403* (2013.01); *B29D 11/00519* (2013.01); *G02B 7/021* (2013.01); *G02B 13/0045* (2013.01); *B29C 45/38* (2013.01); *B29L 2011/0016* (2013.01)

(58) Field of Classification Search
 USPC .......................................................... 359/811
 See application file for complete search history.

(56) References Cited

U.S. PATENT DOCUMENTS

| 2007/0086769 | A1* | 4/2007 | Watanabe | G02B 7/022 |
| | | | | 396/133 |
| 2009/0174954 | A1* | 7/2009 | Hara | G02B 7/021 |
| | | | | 359/819 |
| 2011/0273781 | A1* | 11/2011 | Nuno | G02B 7/021 |
| | | | | 359/696 |
| 2013/0148208 | A1 | 6/2013 | Yang et al. | |
| 2013/0265660 | A1* | 10/2013 | Yoshida | G02B 7/021 |
| | | | | 359/811 |

FOREIGN PATENT DOCUMENTS

| JP | 2013-218116 A | 10/2013 |
| WO | WO 2010/035619 A1 | 4/2010 |
| WO | WO 2012/118041 A1 | 9/2012 |

OTHER PUBLICATIONS

International Search Report for PCT/JP2015/051331 dated Mar. 17, 2015.

Written Opinion of the International Searching Authority for PCT/JP2015/051331 dated Mar. 17, 2015.

* cited by examiner

FIG. 4A
FIG. 4B
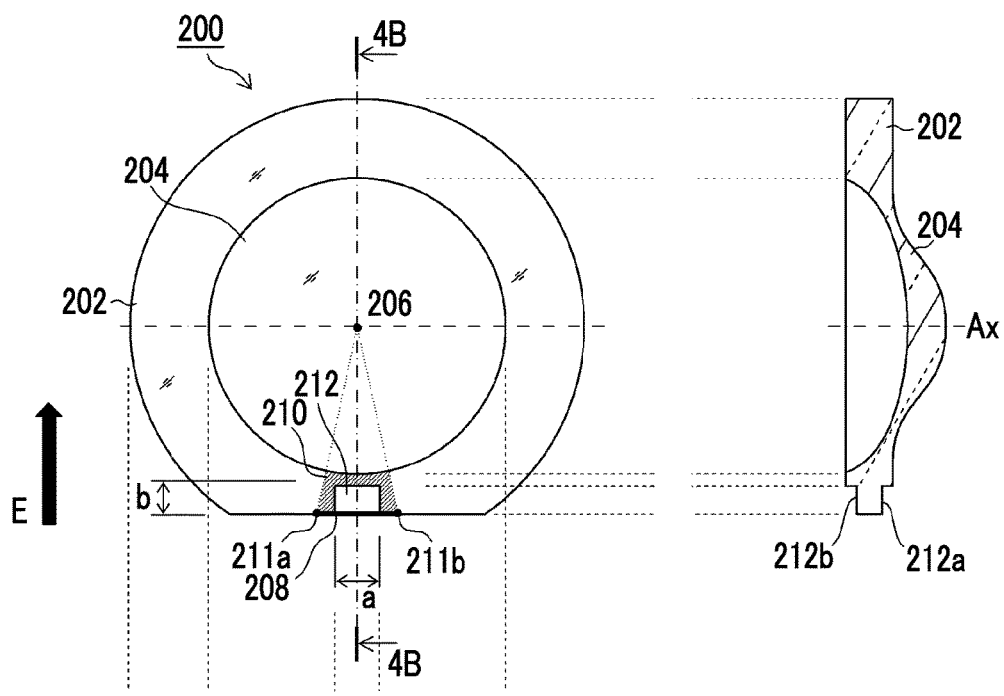
FIG. 4C
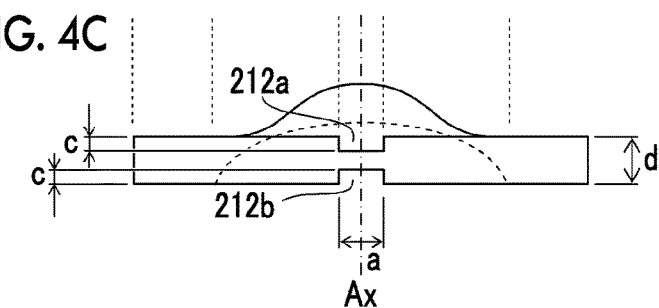

FIG. 11

| PRESSURE (MPa) / MOLD TEMPERATURE (°C) | 20 | 50 | 80 | 110 |
|---|---|---|---|---|
| Tg-5~Tg | 25 | 30 | 35 | 40 |
| Tg-10~Tg-5 | 25 | 30 | 35 | 50 |
| Tg-15~Tg-10 | 30 | 30 | 40 | 55 |
| Tg-20~Tg-15 | 35 | 35 | 50 | 60 |

(UNIT:°)

FIG. 13

| PRESSURE (MPa)<br>MOLD<br>TEMPERATURE (°C) | 20 | 50 | 80 | 110 |
|---|---|---|---|---|
| Tg-5~Tg | 0.5 | 1.0 | 1.5 | 1.9 |
| Tg-10~Tg-5 | 0.8 | 1.2 | 2.0 | 2.3 |
| Tg-15~Tg-10 | 1.2 | 1.3 | 2.1 | 2.5 |
| Tg-20~Tg-15 | 1.4 | 1.5 | 2.4 | 2.6 |

(UNIT: HEIGHT($\mu$m))

FIG. 14

| FLANGE THICKNESS (mm) | OUTER DIAMETER (mm) | TEMPERATURE (°C) | PRESSURE (MPa) | LENS SWELLING (μm) | PERCENTAGE WITH RESPECT TO FLANGE (%) | AMOUNT OF PROCESSING FOR CONCAVE(1) (BOTH FRONT AND REAR SIDES) | REMAINING THICKNESS (mm) | EVALUATION | AMOUNT OF PROCESSING FOR CONCAVE(2) (BOTH FRONT AND REAR SIDES) | REMAINING THICKNESS | EVALUATION | AMOUNT OF PROCESSING FOR CONCAVE(3) (BOTH FRONT AND REAR SIDES) | REMAINING THICKNESS | EVALUATION |
|---|---|---|---|---|---|---|---|---|---|---|---|---|---|---|
| 0.3 | 5.5 | Tg-10 | 65 | 3.0 | 2.0 | 10% | 0.24 | GOOD | 15% | 0.21 | GOOD | 20% | 0.18 | NO GOOD |
| 0.6 | 8.0 | Tg-15 | 110 | 2.6 | 0.9 | 10% | 0.48 | GOOD | 15% | 0.42 | GOOD | 20% | 0.36 | NO GOOD |
| 0.9 | 9.5 | Tg-5 | 85 | 3.0 | 0.7 | 10% | 0.72 | GOOD | 15% | 0.63 | GOOD | 20% | 0.54 | NO GOOD |

OPTICAL LENS, LENS UNIT, IMAGING MODULE, ELECTRONIC APPARATUS, INJECTION MOLDING MOLD, AND INJECTION MOLDING METHOD

CROSS-REFERENCE TO RELATED APPLICATIONS

This application is a Continuation of PCT International Application No. PCT/JP2015/051331 filed on Jan. 20, 2015, which claims priority under 35 U.S.C. § 119(a) to Japanese Patent Application No. 2014-53322 filed on Mar. 17, 2014. Each of the above applications is hereby expressly incorporated by reference, in their entirety, into the present application.

BACKGROUND OF THE INVENTION

1. Field of the Invention

The present invention relates to an optical lens, a lens unit, an imaging module, an electronic apparatus, an injection molding mold, and an injection molding method, and particularly relates to an optical lens which is molded by an injection molding method.

2. Description of the Related Art

In recent years, most smartphones (multi-function mobile phones), mobile phones, tablet terminals, and the like have had cameras. Camera-equipped smartphones and the like are equipped with a small and thin imaging module. The imaging module has a structure where a lens unit and an imaging element unit are incorporated. The lens unit has a built-in optical lens. The imaging element unit has a built-in imaging element such as a charge coupled device (CCD) image sensor or a complementary metal oxide semiconductor (CMOS) image sensor. Further, in most cases, in the lens unit, a plurality of optical lenses may be used in combination.

Some optical lenses used in cameras of smartphones, mobile phones, tablet terminals, and the like are made of resin (for example, a thermoplastic resin), and are manufactured by an injection molding method.

Here, the injection molding method is one of methods of molding resin. In the injection molding method, first, resin is injected into a cavity of a mold (injection molding mold) having a predetermined shape, and the cavity is filled with the resin. Thereafter, by cooling down the injection molding mold, the resin with which the cavity is filled is cooled down and solidified. In such a manner, in the injection molding method, it is possible to obtain a molded article having the same shape as that of the cavity of the injection molding mold.

JP2010-14983A and US2013/0148208A describe a technique relating to an optical lens of a resin which is obtained by an injection molding method.

JP2010-14983A describes a technique for solving a problem that an optical axis of an optical function portion of an optical lens deviates from a direction of reflection on a mirror surface portion provided on a flange portion.

US2013/0148208A describes a technique for preventing weld lines and voids from occurring in an optical function portion of an optical lens.

SUMMARY OF THE INVENTION

Here, when a compact is molded in accordance with the injection molding method, it is preferable that a filling pressure of resin within the cavity of the injection molding mold is uniform. The reason for this is that a part of the compact, to which a high filling pressure is applied, may be swollen when the compact is removed from the mold.

However, it is difficult to make a filling pressure of the resin uniform in terms of characteristics of the injection molding method in which the compact is obtained by injecting the resin form a gate. Accordingly, the molded article obtained by the injection molding method described in JP2010-14983A and US2013/0148208A is swollen at a location, at which the filling pressure is high, near the gate.

If the optical lens is intended to be positioned on the flange portion as a reference plane, it is necessary for the flange portion of the optical lens to have a planar surface. In particular, in a case where the flange portion of the optical lens is swollen, the flange portion is not used as the reference plane, and the positioning of the optical lens is difficult. Here, the planar surface means a surface which is planar without unevenness and swelling on the surface.

The present invention has been made in consideration of the above-mentioned situation. Its object is to provide an optical lens that can be easily positioned by preventing the flange portion from becoming swollen at the part where the filling pressure of the resin is higher than the surrounding thereof. Further, the present invention has an object to provide a lens unit, an imaging module, and an electronic apparatus including the optical lens that can be easily positioned by preventing the flange portion from becoming swollen at the part where the filling pressure of the resin is higher than the surrounding thereof Furthermore, the present invention has an object to provide an injection molding mold and an injection molding method for the optical lens that can be easily positioned by preventing the flange portion from becoming swollen at the part where the filling pressure of the resin is higher than the surrounding thereof According to an aspect of the present invention, there is provided an optical lens comprising: an optical lens that has an optical function portion having an optical function and a flange portion formed around the optical function portion, in which the flange portion has a cut section, which is formed by cutting a gate portion, on a side surface thereof, and in which in a case where the following are viewed from a direction of an optical axis of the optical lens, a concave portion is provided in at least a part of a region in which the flange portion overlaps with a region obtained by connecting together a center of the optical axis of the optical lens and both ends of the cut section, and the concave portion is provided on both surfaces of the flange portion.

According to the present aspect, the concave portion is provided in a region where the filling pressure is high in the flange portion. Therefore, in the optical lens of the present aspect, the flange portion is swollen in the concave portion, and thus swelling on a surface of the flange portion can be avoided. Accordingly, in the optical lens of the present aspect, swelling of the flange portion is avoided, and thus it is possible to easily position the optical lens on a flange portion as a reference. It should be noted that "the region in which the flange portion overlaps with the region surrounded by straight lines connecting together the center of the optical axis of the optical lens and both ends of the cut section in a case where the cut section is viewed from the direction of the optical axis of the optical lens" includes a region in which the filling pressure of the resin is high.

Further, the optical function portion is a part through which light is transmitted in a case where the optical function portion is built into the imaging module or the like.

Preferably, in a case where the optical lens is viewed from the direction of the optical axis, an area of the concave portion in the flange portion is equal to or greater than 5% of an area of the flange portion and equal to or less than 18% thereof According to the present aspect, an area of the concave portion is approximately the same as a range in which swelling of the flange portion occurs. Thus, the optical lens of the present aspect is able to appropriately prevent the flange portion from becoming swollen.

Preferably, a depth of a deepest part of each concave portion of a front side and a rear side of the optical lens is equal to or less than 15% of a maximum thickness of the flange portion.

According to the present aspect, the sum of the depths of the deepest parts of the concave portions on the front side and the rear side of the optical lens is equal to or less than 15% of a maximum thickness of the flange portion, and the flange portion connected to the gate has a predetermined thickness. Consequently, an inlet of an injection molding mold for the resin can be designed to have a predetermined size. Therefore, the optical lens of the present aspect is able to prevent sink marks (dents caused by contraction) and variations in copying of the lens surface or filling of resin from occurring.

According to another aspect of the present invention, there is provided a lens unit comprising at least one optical lens mentioned above, in which at least a part of a region other than the concave portion on at least one of the front side or the rear side of the flange portion is in contact with any of a different optical lens, a light blocking plate, a lens barrel, and a spacing ring.

According to the present aspect, the lens unit includes the optical lens in which swelling of the flange portion is avoided. In the lens unit of the present aspect, the optical lens can be easily positioned. It should be noted that a different member described herein means a different optical lens, a light blocking plate, a lens barrel, or a spacing ring.

According to another aspect of the present invention, there is provided a lens unit comprising at least one optical lens mentioned above, in which at least a part of a region other than the concave portions on both surfaces of the flange portion is in contact with any of a different optical lens, a light blocking plate, a lens barrel, and a spacing ring.

According to the present aspect, the lens unit includes the optical lens in which swelling of the flange portion is avoided. In the lens unit of the present aspect, the optical lens can be easily positioned.

According to another aspect of the present invention, there is provided an imaging module comprising: the above-mentioned lens unit; and an imaging element that captures an image of a subject through the optical lens.

According to the present aspect, the imaging module includes the optical lens in which swelling of the flange portion is avoided. According to the imaging module of the present aspect, the optical lens can be easily positioned.

Preferably, a pixel pitch of the imaging element is equal to or less than 1 µm.

According to the present aspect, the imaging module includes the optical lens in which swelling of the flange portion is avoided. Therefore, in the imaging module of the present aspect, the optical lens can be easily positioned. Consequently, the imaging module of the present aspect is able to appropriately detect a subject image in a case of using the imaging element having a pixel pitch of 1 µm or less.

According to another aspect of the present invention, there is provided an electronic apparatus comprising the above-mentioned imaging module.

Here, the electronic apparatus means a smartphone, a mobile phone, a tablet, a personal computer (PC), a glasses-type device, a wrist watch type device, or the like.

According to another aspect of the present invention, there is provided an injection molding mold for manufacturing an optical lens, which has an optical function portion having an optical function and a flange portion formed around the optical function portion, by injecting resin from a gate into a mold, in which the injection molding mold has a first mold that forms a front side of the optical lens, and a second mold that forms a rear side of the optical lens, and in which in the first mold and the second mold, a convex portion is provided as a part corresponding to the flange portion of the optical lens, in at least a part of a region which is obtained by connecting points corresponding to both ends of the gate and a center of an optical axis of the optical lens.

According to the present aspect, the convex portion is provided in the region in which the filling pressure of the resin is high. Therefore, in the optical lens molded by the injection molding mold of the present aspect, the flange portion is swollen in the concave portion which is formed by the convex portion of the injection molding mold. Consequently, in the optical lens molded by the injection molding mold of the present aspect, by preventing the flange portion from becoming swollen on the flange portion surface, it is possible to easily perform positioning on the basis of the flange portion.

Preferably, a height of each convex portion of the first mold and the second mold is equal to or greater than 1 µm, and the height of each convex portion of the first mold and the second mold is equal to or less than 15% of a maximum thickness of the flange portion.

According to the present aspect, the height of each convex portion of the first mold and the second mold is equal to or greater than 1 µm. Therefore, the optical lens molded by the injection molding mold of the present aspect has a concave portion having a depth which is larger than the height of the swelling of the flange portion. Further, according to the present aspect, the sum of the heights of the convex portions provided in the first mold and the second mold is equal to or less than 15% of the maximum thickness of the flange portion. Therefore, the inlet of the injection molding mold of the present aspect for the resin has a predetermined size. Thereby, in the optical lens molded by the injection molding mold of the present aspect, sink marks and variations in copying of the lens surface or filling of resin are prevented from occurring.

Preferably, the convex portions of the first mold and the second mold are formed on a part corresponding to the flange portion in a range which is equal to or greater than a central angle in connection between a center of an optical axis of the optical function portion and both ends of a width of the gate projected on an inner periphery of the flange portion and which is equal to or less than a central angle of 65° of which a center is a central point of the gate in a width direction.

According to the present aspect, the convex portions provided in the injection molding mold are provided in a region which is substantially the same as the region in which swelling of the flange portion of the optical lens occurs. Consequently, in the optical lens molded by the injection molding mold of the present aspect, it is possible to prevent the flange portion from becoming swollen.

Preferably, the convex portions of the first mold and the second mold include gate bonding portions as parts in which the gate is in contact with the first mold and the second mold, and lengths of the convex portions in a width direction of the flange portion of the convex portion are equal to or less than a length of the flange portion in a width direction.

According to the present aspect, the convex portions are provided to include gate bonding portions as parts in which the gate is in contact with the first mold and the second mold. Thereby, the injection molding mold of the present aspect has the convex portions in the vicinity of the gate where the filling pressure of the resin is high. The optical lens molded by the injection molding mold of the present aspect has concave portions in which swelling can be reliably avoided. Further, according to the present aspect, the length of the flange portion of the convex portion in the width direction is equal to or less than the length of the flange portion in the width direction. Thereby, the optical lens molded by the injection molding mold of the present aspect does not have the concave portions in the optical function portion, and thus the concave portions do not obstruct the optical function.

According to another aspect of the present invention, there is provided an injection molding method of molding an optical lens by injecting resin into the above-mentioned injection molding mold.

According to the present invention, by providing the concave portions in the flange portion of the optical lens, it is possible to provide an optical lens that can be easily positioned by preventing the flange portion from becoming swollen, a lens unit that includes the optical lens, an imaging module, and an electronic apparatus. Further, according to the present invention, it is possible to provide an injection molding mold and an injection molding method for molding the optical lens having such concave portions.

BRIEF DESCRIPTION OF THE DRAWINGS

FIGS. 4A to 4C are diagrams illustrating an appearance of an optical lens.

FIG. 11 is a table showing a relationship between a range in which swelling occurs, an injection pressure of resin, and a temperature of the injection molding mold.

FIG. 13 is a table showing a relationship between a height of swelling, an injection pressure of resin, and a temperature of the injection molding mold.

FIG. 14 is a table showing evaluation of the flange portion.

DESCRIPTION OF THE PREFERRED EMBODIMENTS

Hereinafter, embodiments of the present invention will be described with reference to drawings.

<Imaging Module>

Figure 1:
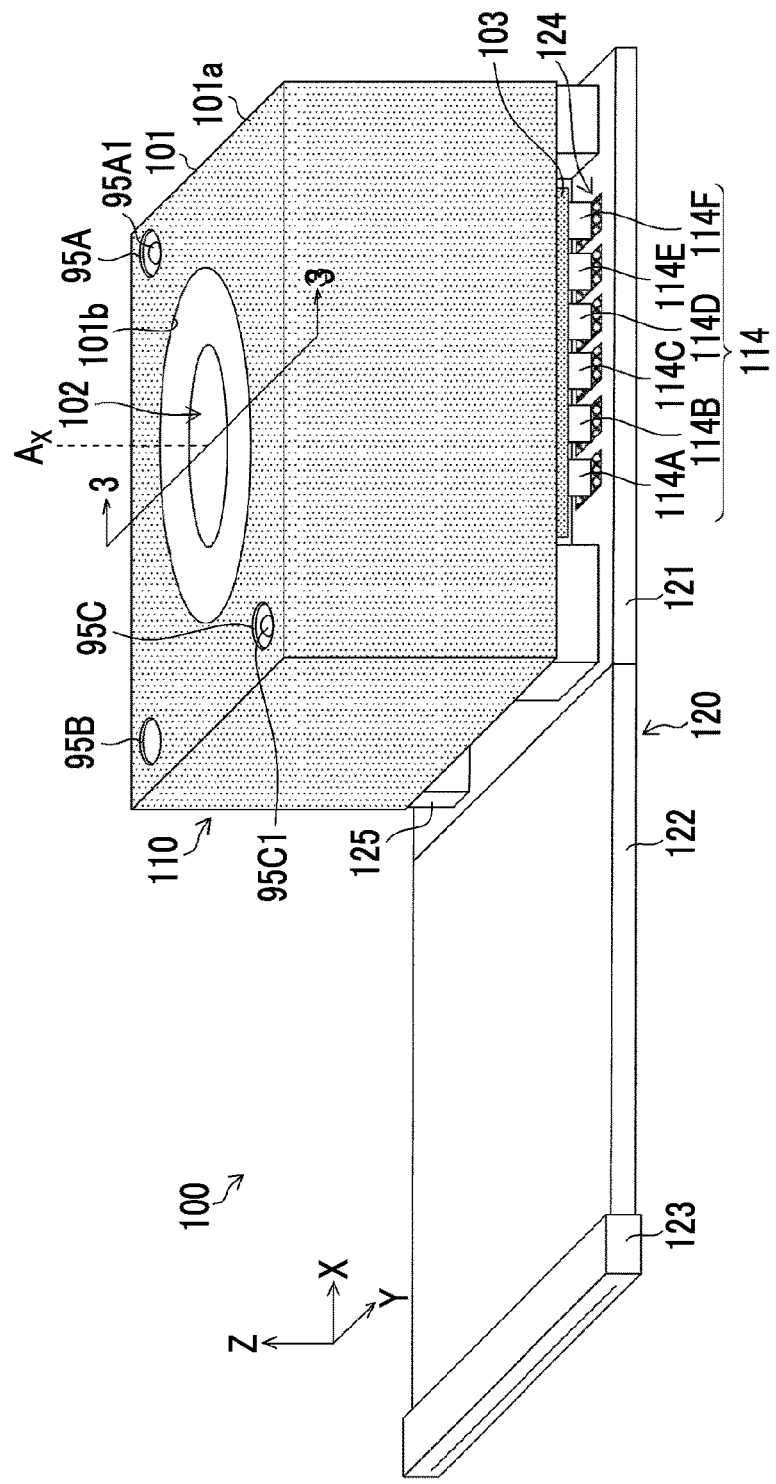
FIG. 1 is a perspective view of an appearance of an imaging module.

FIG. 1 is a perspective view of an appearance of an imaging module 100 according to an embodiment of the present invention.

The imaging module 100 comprises a lens unit 110 that has a lens group 102 including optical lenses 200 (FIG. 4), and an imaging element unit 120 that has an imaging element (not shown in FIG. 1) that captures an image of a subject through the lens group 102.

In FIG. 1, a direction along an optical axis Ax of the lens group 102 is set as a Z direction, and two directions, which are orthogonal to the Z direction and orthogonal to each other, are respectively set as X and Y directions.

The lens unit 110 comprises a housing 101 in which components to be described later are housed.

An opening 101b, of which the center is on the optical axis Ax of the lens group 102, is formed on a top surface 101a of the housing 101. The imaging module 100 performs imaging by capturing subject light from the opening 101b to lens group 102.

Further, positioning concave portions 95A, 95B, and 95C used for holding the lens unit 110 in a manufacturing apparatus at the time of manufacturing the imaging module 100 are formed on the top surface 101a of the housing 101. Concave portions 95A1 and 95C1 smaller than the concave portions 95A and 95C are formed on the bottom surfaces of the concave portions 95A and 95C which are disposed to be diagonal to the top surface 101a.

A part of a flexible substrate 103 housed in the housing 101 is exposed to the outside of the housing 101. A lens unit terminal section 114 included in terminals 114A to 114F is connected to the leading end of an exposed part of the flexible substrate 103. The lens unit terminal section 114 is exposed from a surface other than the top surface 101a on a plane orthogonal to the Z direction among the surfaces constituting the housing 101.

The lens unit terminal section 114 also includes terminals other than the terminals 114A to 114F, but FIG. 1 shows only the terminals 114A to 114F for simplification, and does not show the other terminals.

Figure 2:
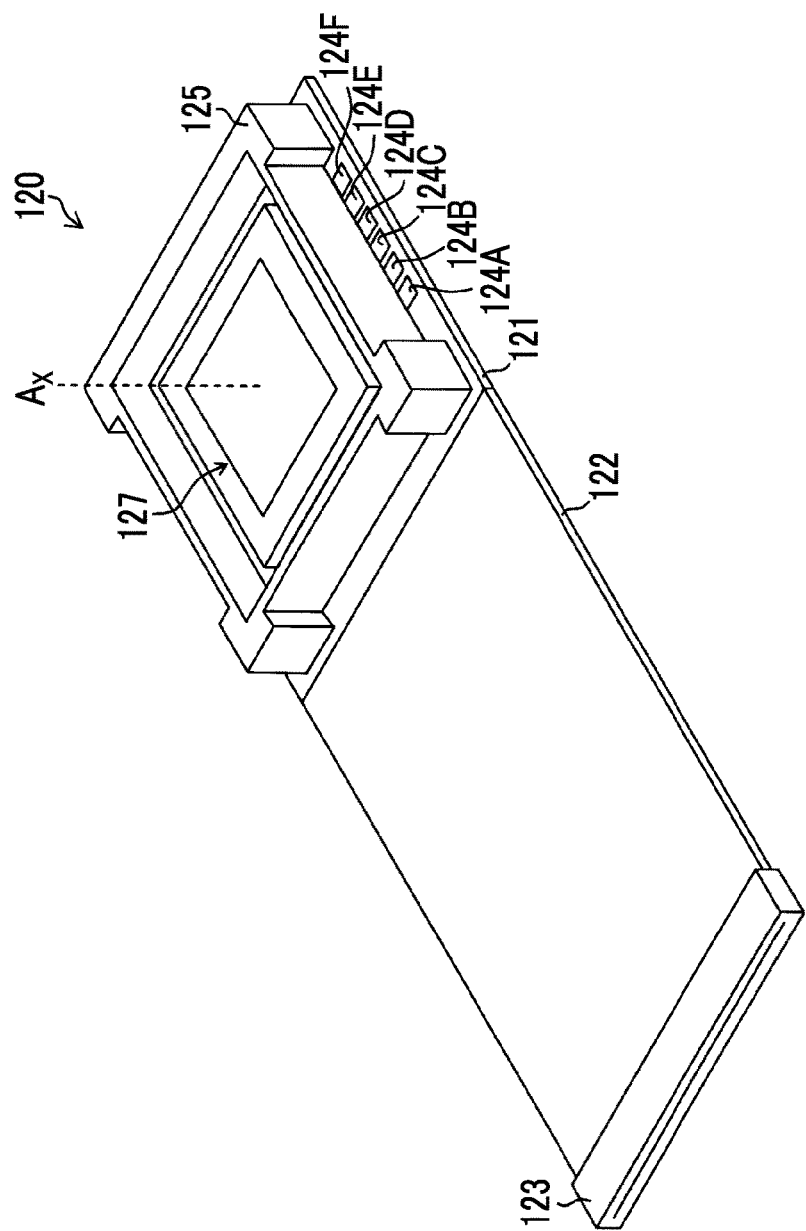
FIG. 2 is a perspective view of an appearance of an imaging element unit in a state where a lens unit is omitted in the imaging module shown in FIG. 1.

FIG. 2 is a perspective view of an appearance of the imaging module 100 shown in FIG. 1 in a state where the lens unit 110 is omitted.

As shown in FIG. 2, the imaging element unit 120 comprises a substrate 121 on which an imaging element 127 such as a CCD image sensor or a CMOS image sensor, and a flexible substrate 122 which is electrically connected to a substrate 121.

The pixel pitch of the imaging element 127 is not particularly limited. However, in the present embodiment, the imaging element 127 having a pixel pitch of 1.0 µm or less is used. Here, the pixel pitch means a shortest distance of distances between centers of photoelectric conversion regions included in pixels belonging to the imaging element 127.

Recently, in accordance with an increase in the number of pixels, the pixel pitch of the imaging element 127 decreases. If the pixel pitch of the imaging element 127 decreases, an area per one pixel decreases. Therefore, a radius of a permissible circle of confusion decreases, and a focal depth thereof decreases. Further, it is necessary to increase an amount of concentrated light per one pixel, and thus an F number of the lens also tends to decrease.

In terms of such a situation, it is necessary for the focal depth of the recent imaging module 100 to be extremely low, and it is necessary for the accuracy of positioning between the lens unit 110 and the imaging element unit 120 to be high. In a case where the pixel pitch is equal to or less than 1 µm, particularly high positioning accuracy is necessary.

A base member 125, which is formed in a barrel shape having an opening corresponding to the imaging element 127, is provided on the substrate 121, and the imaging element 127 is disposed inside the base member 125. A cover glass not shown is inserted into a hollow portion of the base member 125, above the imaging element 127.

An imaging element unit terminal section, which includes terminals 124A to 124F for being electrically connected with the lens unit 110, is provided on the surface of the substrate 121 outside the base member 125. Also in the drawing of the imaging element unit terminal section, only some of the terminals are shown, in a manner similar to that of the lens unit terminal section 114.

An imaging element wire, which is connected to a data output terminal and a driving terminal of the imaging element 127, is provided on the substrate 121. The imaging element wire is connected to an external connection terminal section 123 that is provided on the end portion of the flexible substrate 122, through a wire provided on the flexible substrate 122. The external connection terminal section 123 functions as an electrical connection portion that is electrically connected to the imaging element 127.

Further, a lens unit wire, which is connected to the terminals included in the imaging element unit terminal section, is provided on the substrate 121. The lens unit wire is connected to an external connection terminal section 123 that is provided on the end portion of the flexible substrate 122, through a wire provided on the flexible substrate 122.

In a state where the lens unit 110 and the imaging element unit 120 are fixed, each terminal of the lens unit terminal section is electrically connected to each terminal of the imaging element unit terminal section corresponding thereto.

In FIG. 1, the terminal 114A and the terminal 124A are electrically connected, the terminal 114B and the terminal 124B are electrically connected, the terminal 114C and the terminal 124C are electrically connected, the terminal 114D and the terminal 124D are electrically connected, the terminal 114E and the terminal 124E are electrically connected, and the terminal 114F and the terminal 124F are electrically connected.

Figure 3:
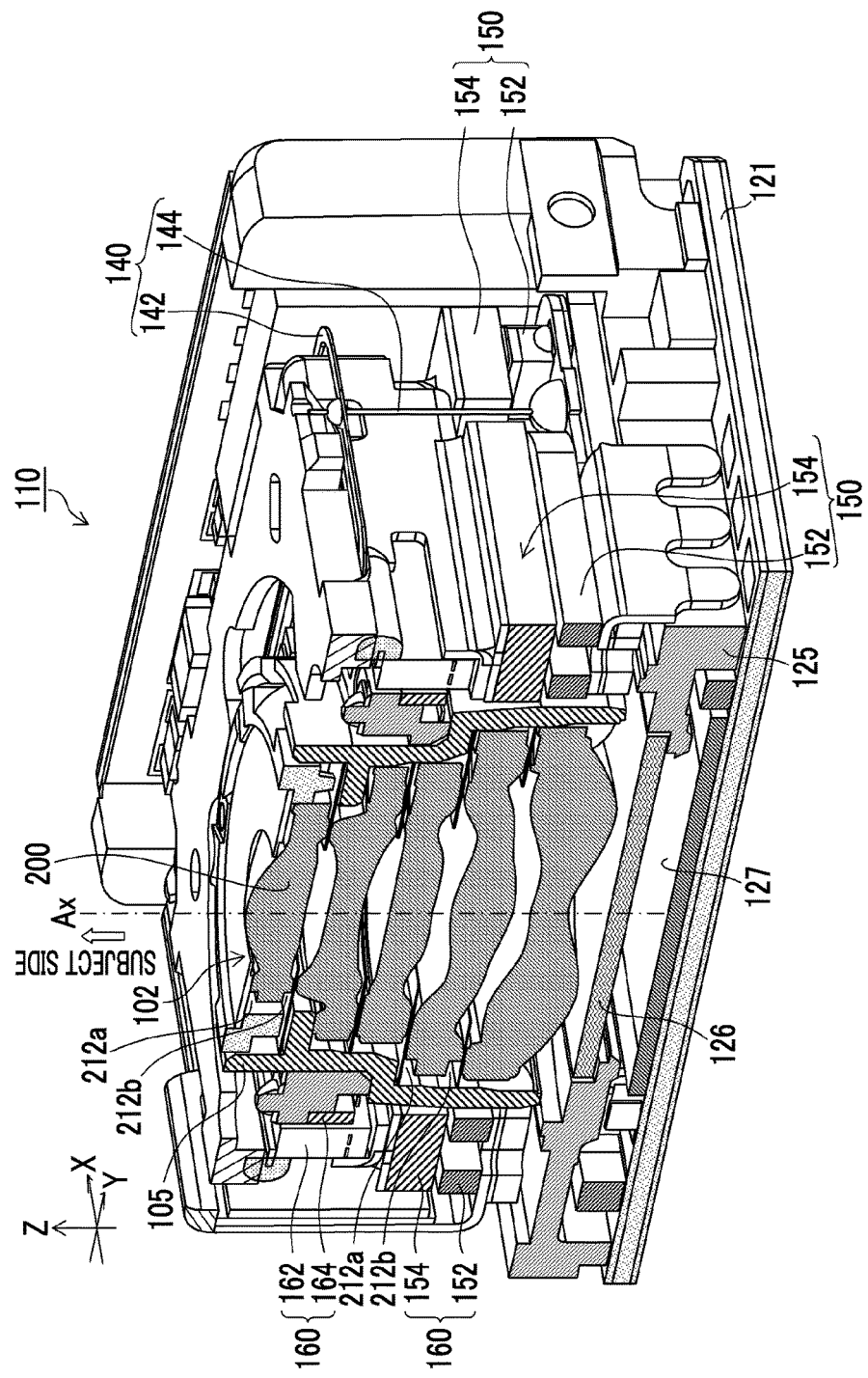
FIG. 3 is a perspective view of a cross-section taken along a sectional line 3-3 of the imaging module shown in FIG. 1.

FIG. 3 is a perspective view of a cross-section taken along a sectional line 3-3 of the imaging module 100 shown in FIG. 1.

As shown in FIG. 3, the imaging element 127 is mounted on the substrate 121, and is sealed by the base member 125, which is provided on the substrate 121, and the cover glass 126 which is inserted into the base member 125.

Further, the lens unit 110 comprises: the lens group 102 that includes a plurality of (five in the example of FIG. 3) optical lenses 200 disposed above the cover glass 126; a lens barrel 105 that has a barrel shape and supports the lens group 102; an elastic supporting section 140; an optical image stabilization (OIS) mechanism 150; and a focus adjustment mechanism 160 that moves the lens barrel 105 in the optical axis direction.

The lens group 102 is configured such that optical positions such as optical axes of the optical lenses 200 are adjusted and the five lenses are combined. The optical lens 200 of the present embodiment included in the lens group 102 has a concave portion 212a on the front side of the flange portion 202 and a concave portion 212b on the rear side of the flange portion 202. The concave portions 212 will be described later. It should be noted that the concave portion 212a and the concave portion 212b are referred to as concave portions 212.

The optical lens 200 has the concave portion 212a and the concave portion 212b in the flange portion 202. Thereby, the optical lens 200 can be positioned on the basis of the flange portion 202 without an effect of the swelling 214 in the flange portion 202. Further, in the optical lens 200, parts other than the concave portions 212 of the flange portion 202 are in contact with the lens barrel 105 as a different member, whereby the position of the optical lens 200 is held.

In the example of FIG. 3, the optical lens 200 is in contact with the lens barrel 105, but is not limited to this aspect. For example, the flange portion 202 of the optical lens 200 may be in contact with another optical lens, a light blocking plate, and/or a spacing ring, whereby the position of the optical lens 200 may be held.

The elastic supporting section 140 includes a leaf spring 142, and four suspension wires 144 of which one end is fixed onto the leaf spring 142 and the other end is fixed onto the base member 125 side.

The OIS mechanism 150 is provided with a voice coil motor that includes OIS driving coils 152, which are fixed onto the base member 125 side (fixed side), and an OIS driving magnet 154.

FIG. 3 shows the pair of OIS driving coils 152 and the OIS driving magnet 154 in the X direction of a 3-axis orthogonal coordinate system in which the optical axis direction of the lens group 102 is set as the Z axis. However, the pair of OIS driving coils 152 and the OIS driving magnet 154 are also provided in the Y direction. By driving the OIS driving coils 152 in the X and Y directions, it is possible to perform hand shaking correction.

The focus adjustment mechanism 160 includes a voice coil motor that is formed of an auto focus (AF) coil 162 and an AF magnet 164 arranged around the lens barrel 105. By driving the voice coil motor so as to move the lens barrel 105 in the optical axis direction (Z direction), it is possible to perform focus adjustment.

Further, the OIS mechanism 150 and the focus adjustment mechanism 160 comprises Hall elements (not shown in the drawing) as position detection elements that respectively detect positions of the lens group 102 (lens barrel 105) in the XYZ axis directions.

<Optical Lens>

FIG. 4A is a plan view of the optical lens 200 according to an embodiment of the present invention as viewed from the optical axis direction. FIG. 4B is a sectional view taken along the sectional line 4B-4B of FIG. 4A. FIG. 4C is a side view of the optical lens 200 shown in FIG. 4A as viewed from the direction of the arrow E.

As shown in FIG. 4A, the optical lens 200 has an optical function portion 204 that have an optical function, and the flange portion 202 that is formed around the optical function portion 204. The direction of the optical axis Ax of the optical lens 200 is a direction of the normal line with respect to the part of FIG. 4A. The optical function portion 204 is a portion through which light is transmitted in a case where it is built into the imaging module and the like and which indicates optical characteristics of the optical lens 200.

A region 210 (hereinafter referred to as a "near-gate region" 210) is near a gate 220 (FIG. 6), and includes a region in which a filling pressure of the resin is high. In the region 210, the flange portion 202 overlaps with a region obtained by straight lines connecting together an optical axis center 206 and both ends 211a and 211b of a cut section 208 in a case where the cut section is viewed from the optical axis direction. It should be noted that the optical axis center 206 is a center of the optical function portion 204 through which the optical axis passes.

The concave portions 212 are provided on at least a part of the near-gate region 210. By providing the concave portions 212 on the near-gate region 210, the swelling 214 (FIG. 5B) of the flange portion 202 occurs in the concave portions.

In a case where the concave portion 212 is viewed from the optical axis direction, by using a width a of the concave portion 212 and a length b of the concave portion 212, an area of the concave portion 212 is calculated on the basis of (Expression 1).

(width $a$ of concave portion)×(length $b$ of concave portion)=area of concave portion    (Expression 1)

Figure 5A:
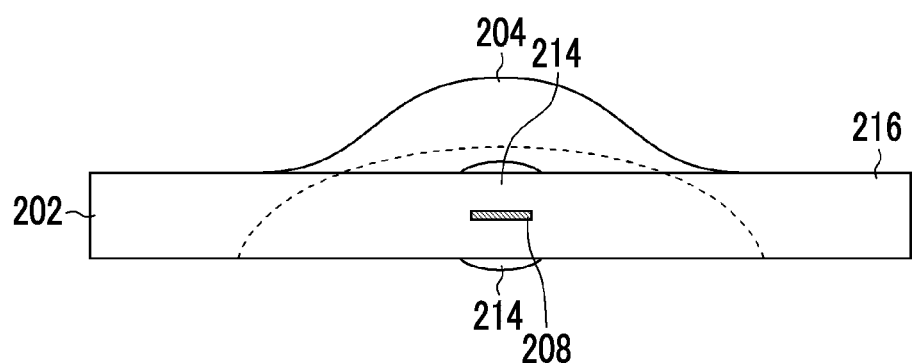
FIG. 5A is a cross-sectional view of the optical lens in which concave portions are not provided in a near-gate region.
Figure 5B:
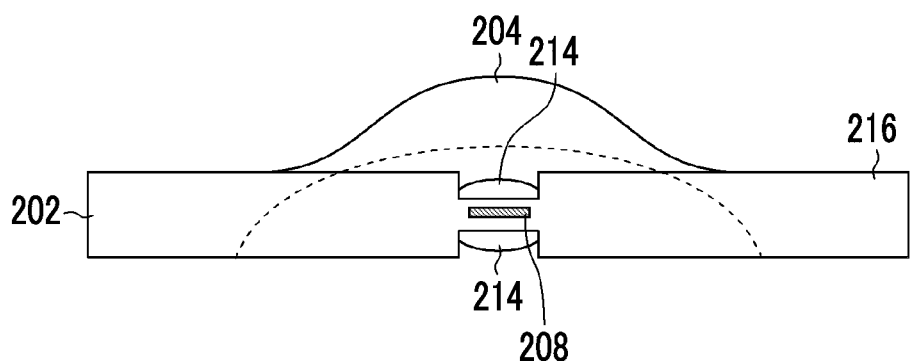
FIG. 5B is a cross-sectional view of the optical lens in which the concave portions are provided in the near-gate region.

The area of the concave portion 212 calculated by the above-mentioned (Expression 1) is preferably equal to or greater than 5% of the area of the flange portion 202 and equal to or less than 18% thereof. Further, the area of the concave portion 212 is preferably equal to or greater than 8% of the area of the flange portion 202 and equal to or less than 15% thereof The concave portion 212 having an area of this range has an area corresponding to an area of the region in which the swelling 214 occurs. Therefore, as shown in FIG. 5B, the swelling 214 is disposed on the concave portion 212, whereby it is possible to effectively avoid the effect of the swelling 214.

The flange portion 202 of the optical lens 200 has the cut section 208, which corresponds to a cut location between the gate portion 238 (FIGS. 8A and 8B) and the flange portion 202, as a side surface. It should be noted that the cut section 208 will be described in detail later.

As shown in FIG. 4B, the concave portion 212a and the concave portion 212b are provided on both surfaces of the flange portion 202 of the optical lens 200. In addition, the front side of the optical lens 200 and the front side of the flange portion 202 correspond to surfaces close to a subject in a case where the optical lens 200 is provided in the lens unit 110, and the rear side of the optical lens 200 and the rear side of the flange portion 202 correspond to surfaces close to an imaging element in a case where the optical lens 200 is provided in the lens unit 110.

As shown in FIG. 4C, the concave portion 212 (each of the concave portion 212a and the concave portion 212b) has a depth c. It is preferable that the depth c of the concave portion 212 is greater than a height of the swelling 214 (FIGS. 5A and 5B). Study on the depth c of the concave portion 212 will be described later. Further, the flange portion 202 has a thickness d, and a thickness, which is obtained by subtracting the depth c of the concave portions 212a and 212b on the front side and the rear side from the thickness d, is referred to as a rest wall thickness. Furthermore, the side surface of the flange portion 202 means a surface of the flange portion 202 that faces neither the imaging element 127 nor the subject in a case where the optical lens 200 is provided on the lens unit 110. It should be noted that the "concave portions 212" indicates the "concave portion 212a" and the "concave portion 212b".

The optical lens 200 shown in FIG. 4 is molded by injecting resin into a mold. The used resin is not particularly limited, and well-known resin may be used. For example, thermoplastic resin is preferably used, and cyclo olefin copolymer (COC), cyclo olefin polymer (COP), acryl, polycarbonate, and the like are used. Further, as resin which can be generally obtained, APEL (registered trademark) 5514 ML is preferably used.

FIGS. 5A and 5B are diagrams illustrating the swelling 214 of the flange portion 202 in the side view of the optical lens 200 shown in FIG. 4C.

As shown in FIG. 5A, the optical lens 200, in which the concave portions 212 are not provided on the near-gate region 210, has the swelling 214 on the flange portion surface 216. When the optical lens 200 is manufactured in the injection molding method, the swelling 214 occurs since the filling pressure of the resin becomes higher than the periphery thereof in the vicinity of the gate 220.

In contrast, in a manner similar to that of the optical lens 200 of the present embodiment shown in FIG. 5B, in the optical lens 200 in which the concave portions 212 are provided on the near-gate region 210, the swelling 214 occurs in the concave portion 212. Consequently, the swelling 214 does not occur on the flange portion surface 216, and the flange portion 202 has a planar surface.

<Injection Molding Mold>

Figure 6:
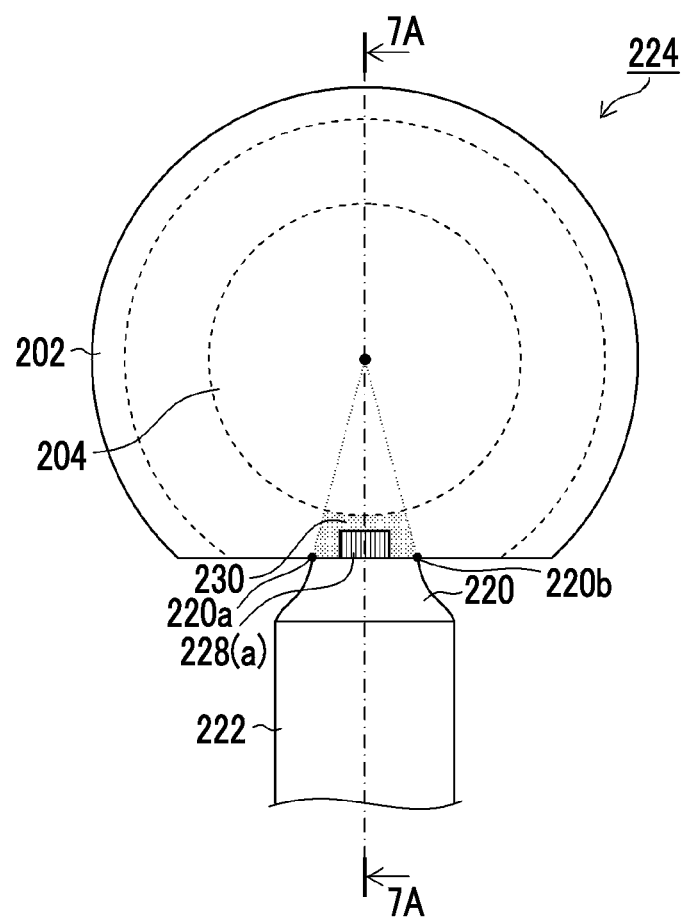
FIG. 6 is a diagram illustrating an appearance of an injection molding mold for molding the optical lens of FIG. 4.
Figure 7A:
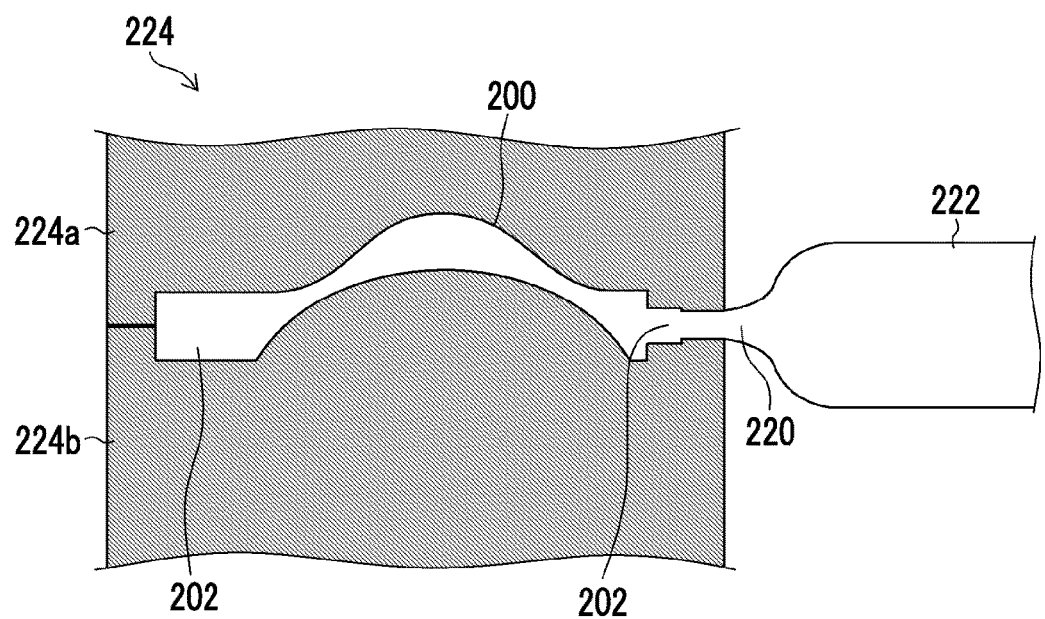
FIG. 7A is a sectional view of the injection molding mold shown in FIG. 6 along a sectional line 7A-7A.
Figure 7B:
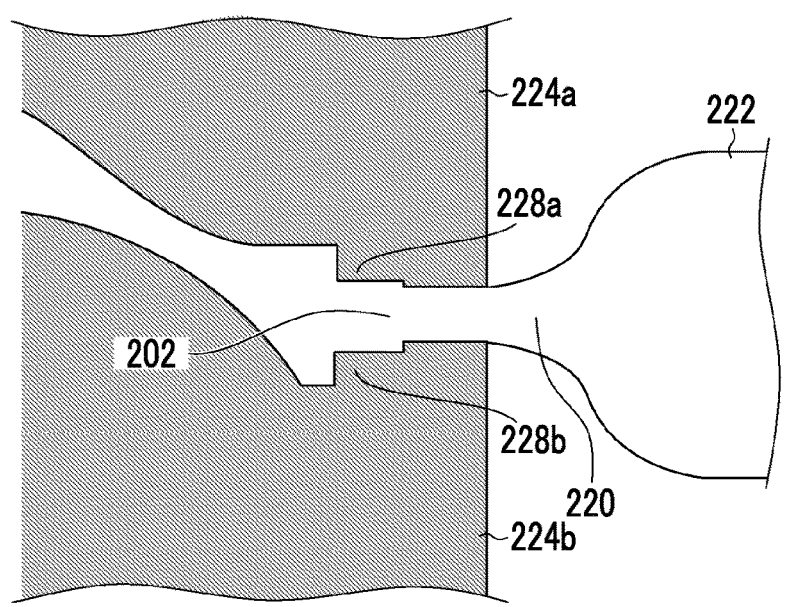
FIG. 7B is an enlarged view of a near-gate portion of the injection molding mold shown in FIG. 7A.

FIG. 6 is a plan view illustrating an appearance of the injection molding mold 224 of the optical lens 200. Further, FIGS. 7A and 7B are sectional views of the injection molding mold 224 shown in FIG. 6 along the sectional line 7A-7A. As shown in FIGS. 6, 7A, and 7B, a runner 222 is connected to the injection molding mold 224 through the gate 220. The resin guided by the runner 222 is injected into a cavity of the injection molding mold 224 through the gate 220.

FIG. 6 shows a region 230 which is obtained by straight lines connecting points corresponding to both ends 220a and 220b of the gate 220 and the optical axis center 206 of the optical lens 200. Then, a convex portion 228a is provided on at least a part of the region 230 which is obtained by the straight lines connecting points corresponding to both ends 220a and 220b of the gate 220 and the optical axis center 206 of the optical lens 200.

Here, the region 230, which is obtained by the straight lines connecting points corresponding to both ends 220a and 220b of the gate 220 and the optical axis center 206 of the optical lens 200, is a place where the filling pressure of the resin is high in the injection molding mold 224.

As shown in FIG. 7A, the injection molding mold 224 has a first mold 224a and a second mold 224b. In the present example, the first mold 224a is a mold for molding the front side of the optical lens 200, and the second mold 224b is a mold for molding the rear side of the optical lens 200. Further, generally, the injection molding mold 224 is formed of a movable side and a fixed side, but is not particularly limited to this example. The first mold 224a or the second mold 224b may be the movable side, and the first mold 224a or the second mold 224b may be the fixed side.

FIG. 7B is an enlarged view of the vicinity of the gate 220 in FIG. 7A. As shown in FIG. 7B, a convex portion 228a is provided on the first mold 224a for molding the front side of the optical lens 200, and a convex portion 228b is provided on the second mold 224b for molding the rear side of the optical lens 200. The above-mentioned concave portions 212a and 212b are formed at the locations of the optical lens 200 corresponding to the convex portions 228a and 228b. It should be noted that the "convex portions 228" indicates the "convex portion 228a" and the "convex portion 228b".

As shown in FIGS. 6, 7A, and 7B, the convex portions 228 include a gate bonding portion at which the gate 220 is in contact with the first mold 224a and the second mold 224b, and it is preferable that the length of each convex portion 228 of the flange portion 202 in the width direction is equal to or less than the length of the width of the flange portion 202. The injection molding mold 224, in which the convex portions 228 are provided to include the gate bonding portion, has the convex portions 228 near the gate 220 in which the filling pressure of the resin is high, and the optical lens 200 molded by the injection molding mold 224 has concave portions 212 at locations where the swelling 214 occurs. Further, the optical function portion 204 of the optical lens 200 has no concave portions 212, and thus the optical function thereof is not obstructed by the concave portions 212. The optical lens 200 is molded by the injection molding mold 224 on which the convex portions 228 having lengths equal to or less than the length of the flange portion 202 are provided.

Figure 8A:
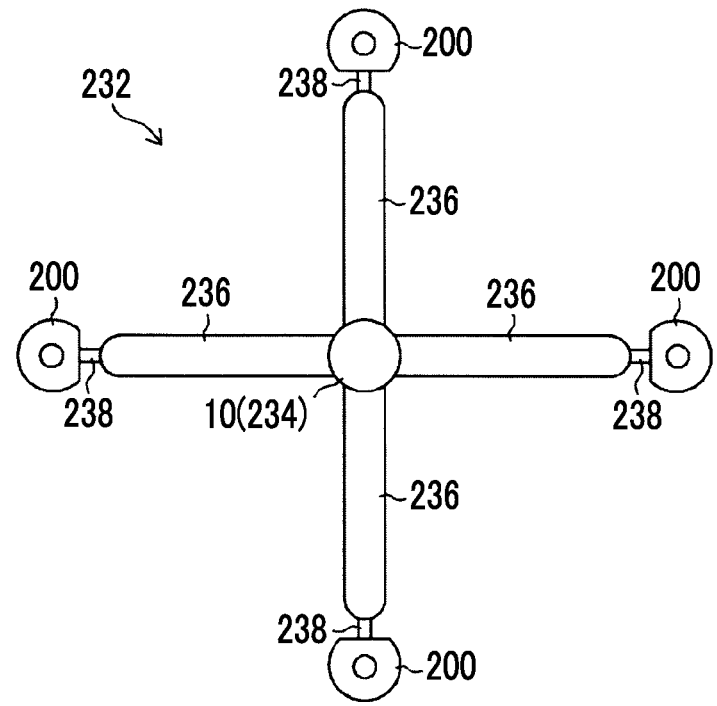
FIG. 8A is a diagram illustrating a molded article obtained by an injection molding method.
Figure 8B:
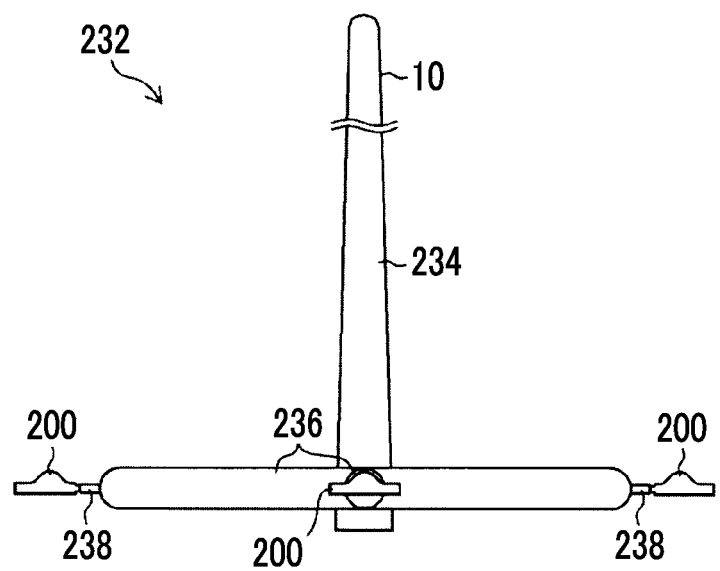
FIG. 8B is a side view of the molded article.

FIG. 8A is a plan view of a molded article 232 obtained using the injection molding mold 224 by the injection molding method. FIG. 8B is a side view of the molded article 232.

As shown in FIGS. 8A and 8B, in a case where the optical lens 200 is obtained by the injection molding method, first, it is possible to obtain the molded article 232 in which a sprue portion 234, a runner portion 236, a gate portion 238, and an optical lens 200 are incorporated. That is, the resin is injected from the sprue, passes through the runner 222, and is supplied to the cavity of the injection molding mold 224 through the gate 220, whereby the molded article 232 is formed of resin with which the sprue, the runner 222, the gate 220 and the cavity are filled and which is cooled down and solidified (FIGS. 8A and 8B). Thereafter, the optical lens 200 is cut out from the obtained molded article 232. At that time, the optical lens 200 has a cut section 208 which is formed on the side surface of the flange portion 202.

The method of cutting the optical lens 200 out from the molded article 232 is not particularly limited, and a well-known method may be used. For example, the cutting is performed by a cutter, a nipper, bare hands, and the like. Further, a condition of the surface of the cut section 208 is different from that of the side surface of the flange portion 202. Therefore, detection can also be performed from the cutout optical lens 200.

Figure 9A:
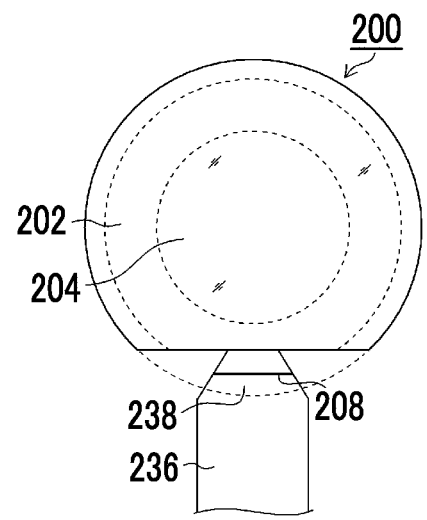
FIG. 9A is a diagram illustrating an example of a cut section.
Figure 9B:
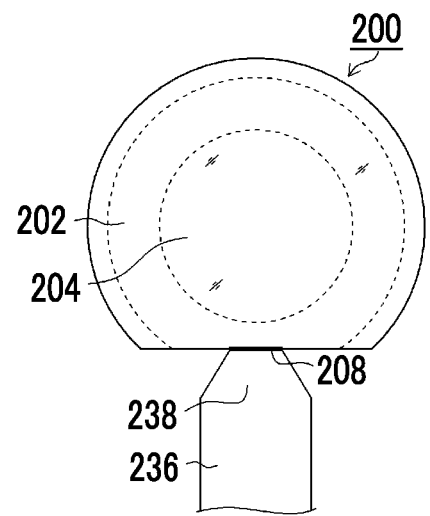
FIG. 9B is a diagram illustrating another example of the cut section.
Figure 9C:
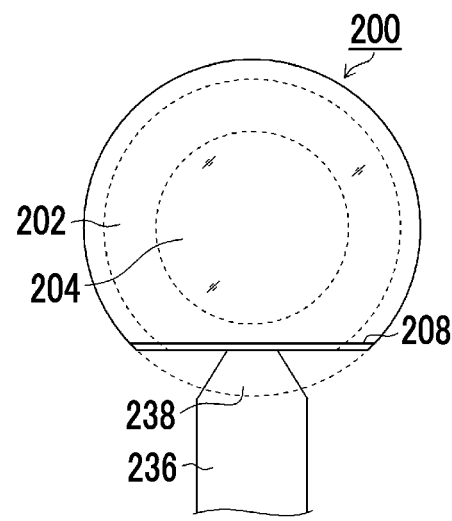
FIG. 9C is a diagram illustrating another example of the cut section.

FIGS. 9A to 9C are diagrams illustrating a position of the cut section 208 between the optical lens 200 and the gate portion 238. The cut section 208 between the optical lens 200 and the gate portion 238 can be set at various positions. For example, as shown in FIG. 9A, cutting may be performed at the cut section 208 of the gate portion 238 which is inner than the virtual flange portion 202 (indicated by the dotted line in the drawing). Further, as shown in FIG. 9B, the cut section 208 may be provided at the boundary between the flange portion 202 and the gate portion 238, and as shown in FIG. 9C, the cut section 208 may be provided on the flange portion 202.

Figure 10A:
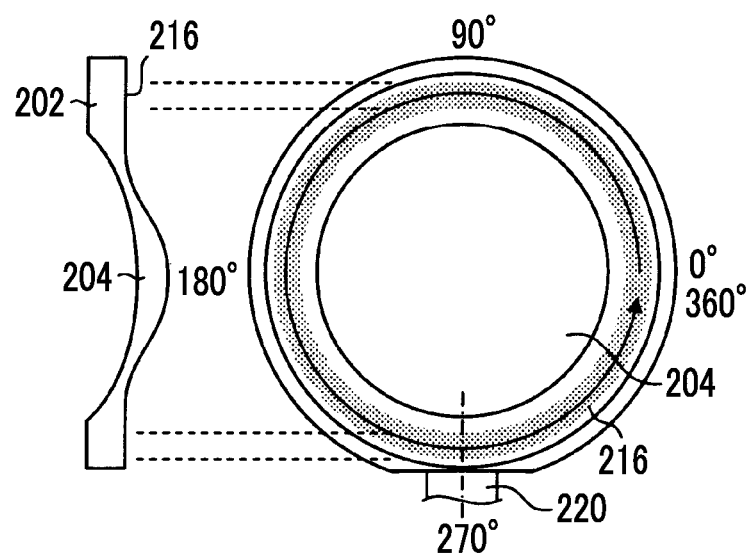
FIG. 10A is a diagram illustrating a range in which swelling occurs, and shows a side view of the optical lens and a plan view of the optical lens viewed from the top.
Figure 10B:
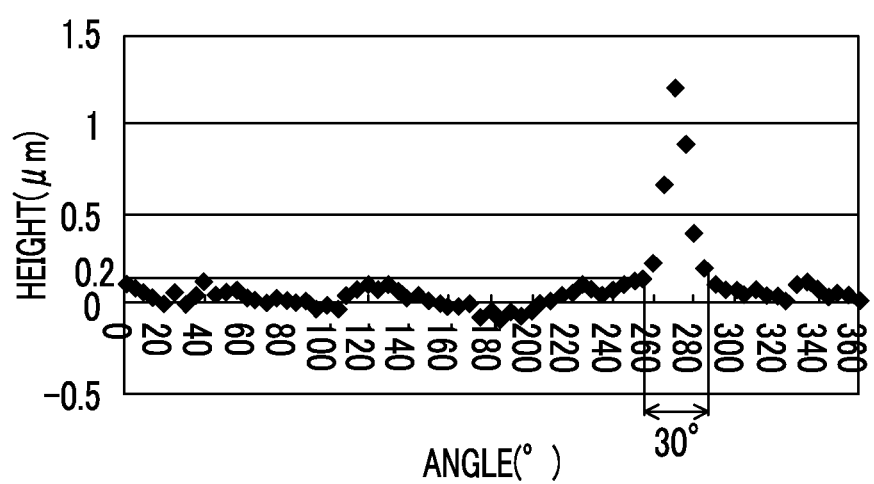
FIG. 10B is a diagram illustrating a range in which swelling occurs, and a graph illustrating results of measurement of heights of swelling on a surface of a flange portion in a case where a temperature of the injection molding mold is equal to or greater than Tg−10° C. and equal to or less than Tg−5° C., at an injection pressure of resin of 50 MPa.

FIGS. 10A and 10B are diagrams illustrating measurement of a range in which the swelling 214 of the flange portion surface 216 occurs, in the optical lens 200 having no concave portions 214. FIG. 10A shows a side view of the optical lens 200 and a plan view of the optical lens 200 viewed from the top. The swelling 214 of the flange portion surface 216 was measured by measuring the height of the flange portion surface 216 in a range of 0° to 360°.

FIG. 10B is graph illustrating results of measurement of heights of the swelling 214 on the flange portion surface 216 in a case where the temperature of the injection molding mold 224 is equal to or greater than Tg−10° C. and equal to or less than Tg−5° C., at an injection pressure of resin of 50 MPa. It should be noted that "Tg" indicates the glass transition temperature of the resin injected. As can be seen from the graph of FIG. 10B, the flange portion surface 216 has the swelling 214 having a height of 0.2 μm or more in a range (a range from 255° to 285°) of 30° centered on a position of 270° at which the gate 220 is present.

FIG. 11 is a diagram illustrating a relationship between the range in which the swelling 214 of the flange portion surface 216 occurs, the injection pressure of resin, and the temperature of the injection molding mold 224.

The table shown in FIG. 11 shows results of measurement which is performed on the range of the swelling 214 by the method described in FIGS. 10A and 10B in cases where the temperature of the injection molding mold 224 is equal to or greater than Tg−5° C. and less than Tg, equal to or greater than Tg−10° C. and less than Tg−5° C., equal to or greater than Tg−15° C. and less than Tg−10° C., and equal to or greater than Tg−20° C. and less than Tg−15° C., in each of cases where the injection pressures of the resin are 20 MPa, 50 MPa, 80 MPa, and 110 MPa.

In the case where the injection pressure of the resin is 20 MPa and the temperature of the injection molding mold 224 is equal to or greater than Tg−5° C. and less than Tg and equal to or greater than Tg−10° C. and less than Tg−5° C., the range of the region of the swelling 214 is 25° which is at the minimum. In contrast, in the case where the injection pressure of the resin is 110 MPa and the temperature of the injection molding mold 224 is equal to or greater than Tg−20° C. and less than Tg−15° C., the range of the region of the swelling 214 is 60° which is at the maximum.

Figure 12A:
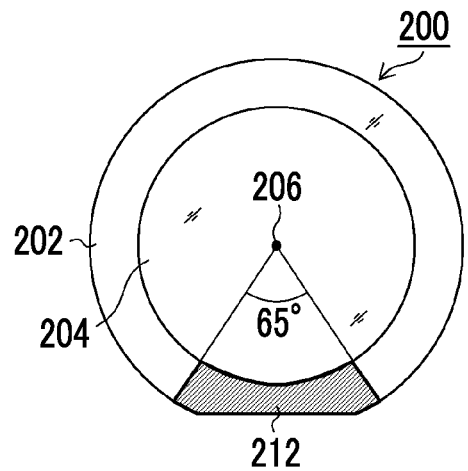
FIG. 12A is a diagram illustrating an appearance of the optical lens, and a diagram illustrating a desirable area of the concave portion of the optical lens.
Figure 12B:
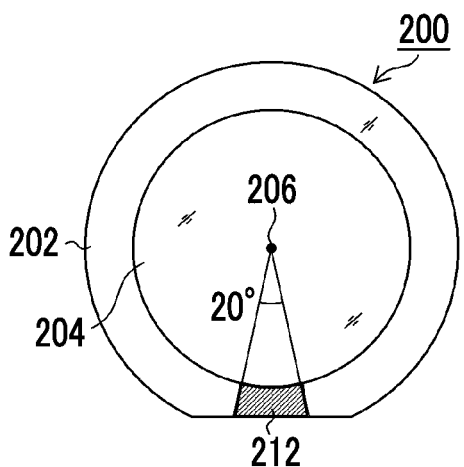
FIG. 12B is a diagram illustrating an appearance of the optical lens, and a diagram illustrating a desirable area of the concave portion of the optical lens.
Figure 12C:
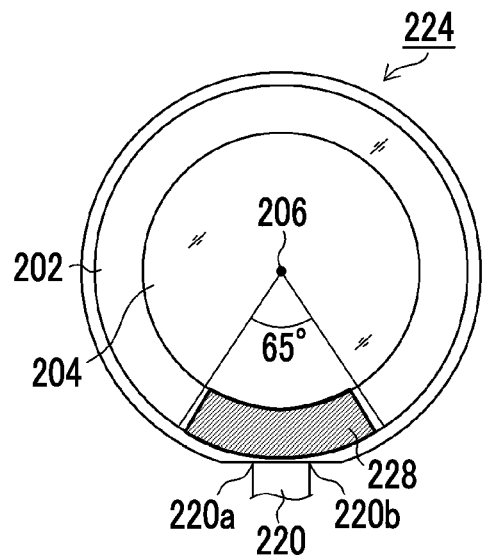
FIG. 12C is a diagram illustrating an appearance of the injection molding mold, and a diagram illustrating a desirable range in which convex portions of the injection molding mold are provided.
Figure 12D:
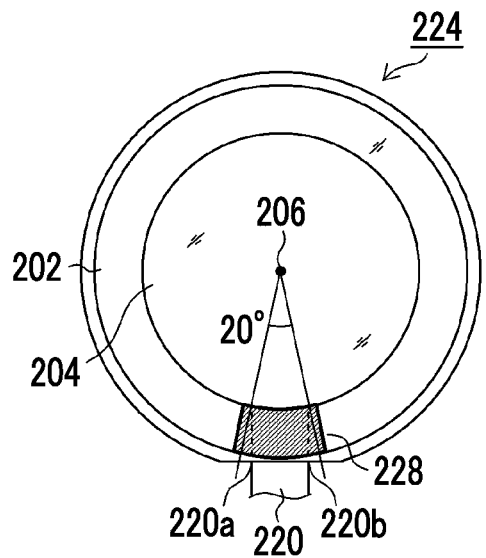
FIG. 12D is a diagram illustrating an appearance of the injection molding mold, and a diagram illustrating a desirable range in which convex portions of the injection molding mold are provided.

FIGS. 12A and 12B are diagrams illustrating desirable areas of the concave portion 212 of the optical lens 200. FIGS. 12C and 12D are diagrams illustrating desirable ranges in which the convex portion 228 of the injection molding mold 224 are provided.

As shown in FIGS. 12A and 12B, in consideration of the range in which the swelling 214 of the above-mentioned flange portion surface 216 shown in FIG. 11 occurs, it is preferable that the concave portion 212 is provided on the flange portion 202 corresponding to a range of a central angle which is equal to or greater than 20° and equal to or less than 65°, where the central angle is centered on the optical axis center 206. That is, in a case where the optical lens 200 is viewed from the optical axis direction, it is preferable that the area of the concave portion 212 of the flange portion 202 is equal to or greater than 5% of the area of the flange portion 202, and equal to or less than 18% thereof. Thereby, the concave portion 212 is formed in accordance with the range of the swelling 214. Thus, the concave portion 212 can be provided such that the swelling 214 occurs in the concave portion 212.

In a case where the optical lens 200 is viewed from the optical axis direction, in a case where the range of the swelling 214 in the flange portion 202 is 20°, an area of about 5% of the flange portion 202 is substantially the same as the range of the swelling 214. In a case where the range of the swelling 214 in the flange portion 202 is 65°, an area of about 18% of the flange portion 202 is substantially the same as the range of the swelling 214.

As shown in FIG. 12C, in consideration of the range in which the swelling 214 of the above-mentioned flange portion surface 216 shown in FIG. 11 occurs, it is preferable that each convex portion 228 is formed on a part corresponding to the flange portion 202 in a range which is equal to or less than a central angle of 65° or less of which the center is a central point of the gate 220 in the width direction.

Further, as shown in FIG. 12D, it is preferable that the convex portions 228 of the first mold 224a and the second mold 224b are formed in a range equal to or greater than that of a part corresponding to the flange portion 202 in a range which has a central angle in connection between the optical axis center 206 of the optical function portion 204 and respective positions at which both ends 220a and 220b of the width of the gate 220 are projected on an inner periphery of the flange portion 202.

By providing the convex portions 228 in the ranges shown in FIGS. 12C and 12D, in the optical lens 200, the concave portions 212 are provided to correspond to the range of the swelling 214. Consequently, also in the cases shown in FIGS. 12C and 12D, the swelling 214 is disposed on each concave portion 212. Thus, it is possible to effectively avoid an effect of the swelling 214.

FIG. 13 is a table showing a relationship between the height of the swelling 214 of the flange portion surface 216, the injection pressure of the resin, and the temperature of the injection molding mold 224.

The table shown in FIG. 13 shows the change in height of the swelling 214 in cases where the temperature of the injection molding mold 224 is equal to or greater than Tg−5° C. and less than Tg, equal to or greater than Tg−10° C. and less than Tg−5° C., equal to or greater than Tg−15° C. and less than Tg−10° C., and equal to or greater than Tg−20° C. and less than Tg−15° C., in each of cases where the injection pressures of the resin are 20 MPa, 50 MPa, 80 MPa, and 110 MPa.

In the case where the injection pressure of the resin is 20 MPa and the temperature of the injection molding mold 224 is equal to or greater than Tg−5° C. and less than Tg, the filling pressure of the resin is low, and the temperature of the injection molding mold 224 is high. Thus, the filling pressure tends to be transferred uniformly. Consequently, the height of the swelling 214 is 0.5 µm which is at the minimum. In contrast, in the case where the injection pressure of the resin is 110 MPa and the temperature of the injection molding mold 224 is equal to or greater than Tg−20° C. and less than Tg−15° C., the temperature is low. Thus, in order to inject the resin with a high viscosity at a high filling pressure, the height of the swelling 214 is 2.6 µm which is at the maximum.

In consideration of the height of the swelling 214 shown in FIG. 13, it is preferable that the heights of the convex portions 228 respectively provided on the first mold 224a and the second mold 224b of the injection molding mold 224 are equal to or greater than 1 µm. If the height of each convex portion 228 is equal to or greater than 1 µm, the swelling 214 is less likely to occur on the flange portion surface 216, it is possible to obtain the planar flange portion surface 216. Further, even in a case where there are manufacturing errors, the swelling 214 is less likely to occur on the flange portion surface 216.

The table shown in FIG. 14 shows evaluation of the optical lens 200 in a case where the depth of the concave portion 212 is changed and the lens is processed.

The optical lens 200, of which the thickness of the flange portion 202 is 0.3 mm and the outer diameter is 5.5 mm, was molded under a condition where the temperature of the injection molding mold 224 is Tg−10° C. and the injection pressure of the resin is 65 MPa. In this case, the height of the swelling 214 of the flange portion 202 on a single side (the front or rear side) was 3.0 µm, and the sum of the heights of the swelling 214 of the flange portion 202 on both sides (the front and rear sides) was 2.0% of the thickness of the flange portion 202.

In a case where the height of the concave portion 212 on a single side was set to 10% of the maximum thickness of the flange portion 202, if the concave portions 212 having the same heights were provided on the flange portion 202 on both sides, the remaining thickness (FIG. 4C) of the flange portion 202 was 0.24 mm. Since the remaining thickness of the flange portion 202 connected to the gate 220 is set to a certain degree, the optical lens 200 having the above-mentioned molding condition and the above-mentioned design condition can be molded by the injection molding mold 224 which is designed such that the inlet of the resin has a predetermined size. Consequently, the optical lens 200 was favorable since sink marks and variations in copying of the lens surface or filling of the resin can be prevented from occurring.

Further, also in a case where the height of the concave portion 212 on a single side was set to 15% of the maximum thickness of the flange portion 202, in a manner similar to that of the case where the height of the concave portion 212 on the above-mentioned single side was set to 10% of the maximum thickness of the flange portion 202, it was possible to obtain a favorable optical lens 200 in which sink marks and variations in copying of the lens surface or filling of the resin are prevented from occurring.

In contrast, in a case where the height of the concave portion 212 on a single side was set to 20% of the maximum thickness of the flange portion 202, the remaining thickness of the flange portion 202 connected to the gate 220 decreased. Thus, molding is performed by the injection molding mold 224 of which the inlet of the injection molding mold 224 for the resin is narrow. Then, the optical lens 200 was not preferable since sink marks and variations in copying of the lens surface or filling of resin occur.

Likewise, also in a case of an optical lens 200 of which the thickness of the flange portion 202 having the molding condition and the design condition shown in FIG. 14 is 0.6 mm and in a case of an optical lens 200 of which the thickness of the flange portion 202 is 0.9 mm, in a case where the height of the concave portion 212 on a single side was set to 10% or 15% of the maximum thickness of the flange portion 202, it was possible to obtain a favorable optical lens 200. In contrast, in a case where the height of the concave portion 212 on a single side was set to 20% of the maximum thickness of the flange portion 202, the optical lens 200 is not preferable since sink marks and variations in copying of the lens surface or filling of the resin occur.

In the above description, embodiments of the present invention has been described centering on the optical lens 200 included in the lens unit 110 and the injection molding mold 224 for molding the optical lens 200. However, the present invention is not limited to the above-mentioned embodiments. For example, a method of molding the optical lens 200 is also included in the present invention by using the injection molding mold 224.

Examples of the electronic apparatus equipped with the imaging module 100 having the configuration may include a smartphone, a mobile phone, a tablet terminal, a portable information terminal (PDA), an eyeglass-type information terminal, a portable game machine, a portable music player, a camera-equipped clock, and the like. Hereinafter, a detailed description will be given of an example of a smartphone with reference to the accompanying drawings.

<Configuration of Smartphone>

Figure 15:
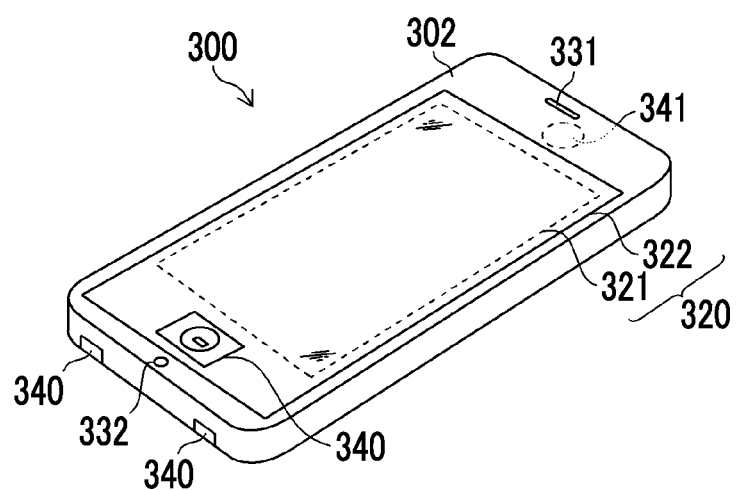
FIG. 15 is a diagram illustrating an appearance of a smartphone as an embodiment of an electronic apparatus.

FIG. 15 is a diagram illustrating an appearance of a smartphone 300 equipped with the imaging module 100. The smartphone 300 shown in FIG. 15 comprises: a housing 302 that has a flat plate shape; a display panel 321 as a display section on one side of the housing 302; and a display input section 320 into which an operation panel 322 as an input section is integrated. Further, the housing 302 comprises a speaker 331, a microphone 332, an operation section 340, and a camera section 341 including the above-mentioned imaging module 100.

The camera section 341 is disposed on the rear surface side facing the operation side surface on which the speaker 331 is disposed, in the vicinity of the speaker 331 which is a magnetic field generating section. Further, the configuration of the housing 302 is not limited to this. For example, it may be possible to adopt a configuration in which the input section and the display section are independently provided, or it may be possible to adopt a configuration having a slide mechanism or a folded structure.

Figure 16:
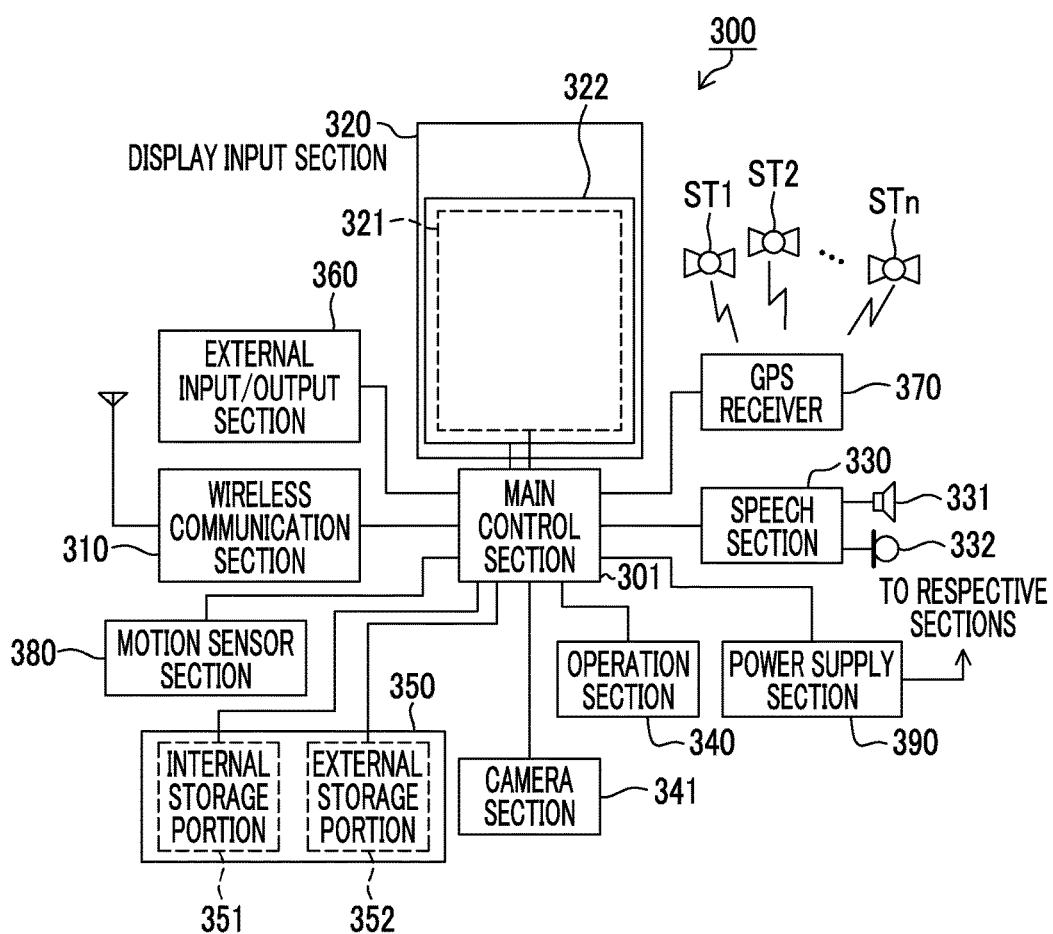
FIG. 16 is a block diagram illustrating a configuration of the smartphone.

FIG. 16 is a block diagram illustrating a configuration of the smartphone 300 shown in FIG. 15. As shown in FIG. 16, as main components of the smartphone 300, there are a wireless communication section 310, a display input section 320, a speech section 330, operation sections 340, a camera section 341, a storage section 350, an external input/output section 360, a global positioning system (GPS) receiver 370, a motion sensor section 380, a power supply section 390, and a main control section 301. Further, as the main function of the smartphone 300, there is provided a wireless communication function for performing mobile wireless communication with a base station device through a mobile communication network.

The wireless communication section 310 performs wireless communication with the base station device, which is included in the mobile communication network, in accordance with an instruction of the main control section 301. Using this wireless communication, various kinds of file data such as audio data and image data, e-mail data, and the like are transmitted and received, and web data, streaming data, and the like are received.

The display input section 320 is a so-called touch panel, and comprises the display panel 321 and the operation panel 322. The touch panel displays image (still image and moving image) information, text information, or the like so as to visually transfer the information to a user in accordance with control of the main control section 301, and detects a user operation on the displayed information. In a case of monitoring a generated 3D image, it is preferable that the display panel 321 is a 3D display panel.

The display panel 321 uses a liquid crystal display (LCD), an organic electro-luminescence display (OELD), or the like as a display device.

The operation panel 322 is a device that is provided for viewing an image which is displayed on a display screen of the display panel 321 and that detects coordinates at which an operation is performed by a user's finger or a stylus. If such a device is operated by a user's finger or a stylus, the device outputs a detection signal, which is generated due to the operation, to the main control section 301. Subsequently, the main control section 301 detects an operation position (coordinates) on the display panel 321, on the basis of the received detection signal.

As shown in FIG. 15, the display panel 321 and the operation panel 322 of the smartphone 300 are integrated to constitute the display input section 320. However, the operation panel 322 is disposed to completely cover the display panel 321. When this arrangement is adopted, the operation panel 322 may have a function of also detecting a user operation in a region outside the display panel 321. In other words, the operation panel 322 may comprise a detection region (hereinafter referred to as a display region) for a part which overlaps with the display panel 321 and a detection region (hereinafter referred to as a non-display region) for the other part at the outer edge which does not overlap with the display panel 321.

It should be noted that a size of the display region and a size of the display panel 321 may completely coincide with each other, but it is not always necessary for both to coincide with each other. Further, the operation panel 322 may comprise two sensing regions of the outer edge part and the other inside part. Furthermore, a width of the outer edge part is appropriately designed depending on a size of the housing 302 and the like. In addition, examples of the position detection method adopted by the operation panel 322 may include a matrix switch method, a resistance film method, a surface elastic wave method, an infrared method, an electromagnetic induction method, and an electrostatic capacitance method, and the like, and any method may be adopted.

The speech section 330 comprises a speaker 331 and a microphone 332. The speech section 330 converts a sound of a user, which is input through the microphone 332, into sound data, which can be processed in the main control section 301, and outputs the data to the main control section 301, or decodes sound data, which is received by the wireless communication section 310 or the external input/output section 360, and outputs the data from the speaker 331. Further, as shown in FIG. 15, for example, the speaker 331 and the microphone 332 can be mounted on the same surface as the surface on which the display input section 320 is provided.

The operation section 340 is a hardware key using a key switch or the like, and receives an instruction from a user. For example, the operation sections 340 are pressing button type switches which are mounted on the lower side surface of the lower part of the housing 302 of the smartphone 300. Each switch is turned on if it is pressed by a finger or the like, and is turned off due to restoring force of a spring if the finger is released.

The storage section 350 stores a control program and control data of the main control section 301, address data in which names, phone numbers, and the like of communication partners are associated, received and transmitted e-mail data, web data which is downloaded by web browsing, and downloaded contents data, and temporarily stores streaming data and the like. Further, the storage section 350 is constituted of an internal storage portion 351, which is built into the smartphone, and an external storage portion 352 which has a removable external memory slot. In addition, each of the internal storage portion 351 and the external storage portion 352 constituting the storage section 350 is implemented by using a storage medium such as a flash memory type, a hard disk type, a multimedia card micro type, a card type memory (such as a Micro SD (registered trademark) memory), a random access memory (RAM), or a read only memory (ROM).

The external input/output section 360 has a function of an interface with all external devices connected to the smartphone 300. The external input/output section 360 is for communication (such as universal serial bus (USB) or IEEE1394) with other external devices, direct or indirect connection to networks (such as the Internet, wireless LAN, Bluetooth (registered trademark), radio frequency identification (RFID), infrared communication (Infrared Data Association: IrDA) (registered trademark), ultra wideband (UWB) (registered trademark), and ZigBee (registered trademark)), or the like.

Examples of the external devices connected to the smartphone 300 include a wired/wireless headset, a wired/wireless external charger, a wired/wireless data port, a memory card which is connected through a card socket, a subscriber identity module (SIM) or user identity module (UIM) card, external audio and video devices which are connected through audio and video input/output (I/O) terminals, external audio and video devices which are connected in a wireless manner, a smartphone which is connected in a wired or wireless manner, a personal computer which is connected in a wired or wireless manner, a PDA which is connected in a wired or wireless manner, an earphone which is connected in a wired or wireless manner, and the like. The external input/output section is able to transfer the data, which is transmitted from such external devices, to the components within the smartphone 300, and to transmit the data within the smartphone 300 to the external devices.

The GPS receiver 370 receives a plurality of GPS signals, which are transmitted from GPS satellites ST1 to STn, in accordance with instructions of the main control section 301, executes positioning calculation processing based on the received GPS signals, and detects a position formed of a latitude, a longitude, and an altitude of the smartphone 300. The GPS receiver 370 may detect the position by using position information when it is possible to acquire the position information from the wireless communication section 310 or the external input/output section 360 (for example, wireless LAN).

The motion sensor section 380 includes, for example, a triaxial acceleration sensor, and detects physical movement of the smartphone 300, in accordance with an instruction of the main control section 301. By detecting physical movement of the smartphone 300, an acceleration and a direction of the movement of the smartphone 300 are detected. This detection result is output to the main control section 301.

The power supply section 390 supplies the respective sections of the smartphone 300 with electric power, which is stored in a battery (not shown), in accordance with an instruction of the main control section 301.

The main control section 301 comprises a micro processor, and integrally controls the respective sections of the smartphone 300 by performing an operation on the basis of control data or a control program stored in the storage section 350. Further, the main control section 301 has an application processing function and a mobile communication control function of controlling the respective sections of a communication system in order to perform data communication and sound communication through the wireless communication section 310.

The application processing function is implemented by an operation of the main control section 301 using application software stored in the storage section 350. Examples of the application processing function include: an infrared communication function of performing data communication with other devices by controlling the external input/output section 360; an e-mail function of transmitting and receiving e-mails; a web browsing function of browsing web pages; and the like.

Further, the main control section 301 has an image processing function of displaying a video on the display input section 320 and the like, on the basis of image data (still image and moving image data) such as received data and downloaded streaming data. The image processing function means a function of causing the main control section 301 to decode the image data, apply image processing to the decoding result, and display an image on the display input section 320.

Further, the main control section 301 executes display control for the display panel 321 and operation detection control to detect the user operation through the operation sections 340 and the operation panel 322.

Through execution of the display control, the main control section 301 displays an icon for activating application software and a window for displaying a software key such as a scroll bar or creating an e-mail. It should be noted that the scroll bar means a software key for receiving an instruction to move a display portion of an image on a large image which cannot be entirely shown in the display region of the display panel 321.

Further, through execution of the operation detection control, the main control section 301 detects the user operation performed through the operation section 340, receives an operation performed on the icon or a text input performed in an input field of the window through the operation panel 322, or receives a request to scroll a displayed image through the scroll bar.

Furthermore, the main control section 301 has a touch panel control function performed through execution of the operation detection control. The function determines whether the operation position of the operation panel 322 is in the overlapping part (display region) which overlaps with the display panel 321 or the other part (non-display region) at the outer edge which does not overlap with the display panel 321, and controls the display position of the software key or the sensing region of the operation panel 322.

In addition, the main control section 301 may detect a gesture operation performed on the operation panel 322, and may execute a preset function in response to the detected gesture operation. The gesture operation is not a simple touch operation used in the past. The gesture operation means an operation for drawing a locus with a finger or the like, an operation of specifying a plurality of positions at the same time, or an operation of drawing loci from a plurality of positions to at least one position as a combination of the above-mentioned operations.

The camera section 341 is a digital camera for performing electronic photography by using the imaging element such as a complementary metal oxide semiconductor (CMOS) or a charge-coupled device (CCD). The above-mentioned imaging module 100 can be applied to the camera section 341. Further, the camera section 341 has a lens group 102 including the above-mentioned optical lens 200.

Under the control of the main control section 301, the camera section 341 is able to convert the image data, which is obtained through image capturing, into compressed image data such as data of a joint photographic coding experts group (JPEG), and to record the data in the storage section 350 and to output the data through the external input/output section 360 or the wireless communication section 310. As shown in FIG. 15, in the smartphone 300, the camera section 341 is mounted on the rear side facing the display input section 320. However, the mounting position of the camera section 341 is not limited to this. The camera section 341 may be mounted on the same side as the display input section 320, or a plurality of camera sections 341 may be mounted. In addition, in the case where the plurality of camera sections 341 is mounted, imaging may be performed using a single camera section 341 by selecting the camera section 341 for the imaging, or imaging may be performed using the plurality of camera sections 341 at the same time.

Further, the camera section 341 can be used in various functions of the smartphone 300. For example, an image, which is acquired by the camera section 341, can be displayed on the display panel 321, and an image of the camera section 341 can be used for one of the operation inputs of the operation panel 322. Further, when the GPS receiver 370 detects a position, the GPS receiver 370 may detect the position with reference to an image obtained from the camera section 341. Further, it may be possible to determine a direction of an optical axis of the camera section 341 of the smartphone 300 or determine a current user environment, using the GPS receiver 370 in a combination with the triaxial acceleration sensor or without using the triaxial acceleration sensor, with reference to the image acquired from the camera section 341. Needless to say, the image acquired from the camera section 341 may be used in the application software.

[Others]

In the OIS mechanism 150 of the above-mentioned embodiment, the OIS driving coils 152 which are disposed on the base member side (fixed side), and the OIS driving magnet 154 is disposed on the movable section side (movable side) for hand shaking correction. However, contrary to this, the OIS driving magnet may be disposed on the base member side, and the OIS driving coils may be disposed on the movable section side for hand shaking correction.

Further, the lens group 102 is not limited to the configuration using five lenses, and can be applied to various lenses.

It is apparent that the present invention is not limited to the above-mentioned embodiments, and may be modified into various forms without departing from the scope of the present invention.

EXPLANATION OF REFERENCES

100: imaging module
101: housing
102: lens group
103, 122: flexible substrate
105: lens barrel
110: lens unit
114: lens unit terminal section
120: imaging element unit
121: substrate
125: base member
126: cover glass
127: imaging element
140: elastic supporting section
142: leaf spring
144: suspension wire
150: OIS mechanism
152: OIS driving coil
154: OIS driving magnet
160: focus adjustment mechanism
162: AF coil
164: AF magnet
200: optical lens
202: flange portion
204: optical function portion
206: optical axis center
208: cut section
210: near-gate region
212, 212a, 212b: concave portion
214: swelling
216: flange portion surface
220: gate
222: runner
224: injection molding mold
228, 228a, 228b: convex portion
232: molded article
234: sprue portion
236: runner portion
238: gate portion
300: smartphone
Ax: optical axis

What is claimed is:

1. An optical lens comprising:
   an optical lens that has an optical function portion having an optical function and a flange portion formed around the optical function portion,
   wherein the flange portion has a cut section, which is formed by cutting a gate portion, on a side surface thereof, and
   wherein in a case where the following are viewed from a direction of an optical axis of the optical lens, concave portions are provided in at least a part of a region in which the flange portion overlaps with a region obtained by connecting together a center of the optical axis of the optical lens and both ends of the cut section, and a first concave portion of the concave portions is provided on a first surface of the flange portion and a second concave portion of the concave portions is provided on a second surface of the flange portion, the first surface of the flange portion opposite to the second surface of the flange portion,
   wherein the first and second concave portions are not provided around an entire circumference of the flange portion.

2. The optical lens according to claim 1, wherein a depth of a deepest part of the first concave portion provided on the first surface of the flange portion and the second concave portion provided on the second surface of the flange portion of the optical lens is equal to or less than 15% of a maximum thickness of the flange portion.

3. A lens unit comprising at least one optical lens according to claim 1,
wherein at least a part of a region other than the first concave portion or the second concave portion is in contact with any of a different optical lens, a light blocking plate, a lens barrel, and a spacing ring.

4. A lens unit comprising at least one optical lens according to claim 1,
wherein at least a part of a region other than the first concave portion and the second concave portion is in contact with any of a different optical lens, a light blocking plate, a lens barrel, and a spacing ring.

5. An imaging module comprising:
the lens unit according to claim 3; and
an imaging element that captures an image of a subject through the optical lens.

6. The imaging module according to claim 5, wherein a pixel pitch of the imaging element is equal to or less than 1 µm.

7. An electronic apparatus comprising the imaging module according to claim 5.

8. The optical lens according to claim 1,
wherein in a case where the optical lens is viewed from the direction of the optical axis, an area of the first concave portion provided on the first surface of the flange portion is equal to or greater than 5% of an area of the flange portion and equal to or less than 18% thereof.

9. An optical lens comprising:
an optical lens that has an optical function portion having an optical function and a flange portion formed around the optical function portion,
wherein the flange portion has a cut section, which is formed by cutting a gate portion, on a side surface thereof, and
wherein in a case where the following are viewed from a direction of an optical axis of the optical lens, concave portions are provided in at least a part of a region in which the flange portion overlaps with a region obtained by connecting together a center of the optical axis of the optical lens and both ends of the cut section, and a first concave portion of the concave portions is provided on a first surface of the flange portion and a second concave portion of the concave portions is provided on a second surface of the flange portion, the first surface of the flange portion opposite to the second surface of the flange portion,
wherein the first and second concave portions abut the cut section.

10. The optical lens according to claim 9, wherein a depth of a deepest part of the first concave portion provided on the first surface of the flange portion and second concave portion provided on the second surface of the flange portion of the optical lens is equal to or less than 15% of a maximum thickness of the flange portion.

11. An imaging module comprising:
the lens unit according to claim 9, wherein at least a part of a region other than the first concave portion or the second concave portion is in contact with any of a different optical lens, a light blocking plate, a lens barrel, and a spacing ring; and
an imaging element that captures an image of a subject through the optical lens.

12. The imaging module according to claim 11, wherein a pixel pitch of the imaging element is equal to or less than 1 µm.

13. An optical lens comprising:
an optical lens that has an optical function portion having an optical function and a flange portion formed around the optical function portion,
wherein the flange portion has a cut section, which is formed by cutting a gate portion, on a side surface thereof, and
wherein in a case where the following are viewed from a direction of an optical axis of the optical lens, concave portions are provided in at least a part of a region in which the flange portion overlaps with a region obtained by connecting together a center of the optical axis of the optical lens and both ends of the cut section, and a first concave portion of the concave portions is provided on a first surface of the flange portion and a second concave portion of the concave portions is provided on a second surface of the flange portion, the first surface of the flange portion opposite to the second surface of the flange portion,
wherein the first and second concave portions are located wholly in the region obtained by connecting together the center of the optical axis of the optical lens and both ends of the cut section.

14. The optical lens according to claim 13, wherein a depth of a deepest part of the first concave portion provided on the first surface of the flange portion and second concave portion provided on the second surface of the flange portion of the optical lens is equal to or less than 15% of a maximum thickness of the flange portion.

15. An imaging module comprising:
the lens unit according to claim 13, wherein at least a part of a region other than the first concave portion or the second concave portion is in contact with any of a different optical lens, a light blocking plate, a lens barrel, and a spacing ring; and
an imaging element that captures an image of a subject through the optical lens.

16. The imaging module according to claim 15, wherein a pixel pitch of the imaging element is equal to or less than 1 µm.

17. The optical lens according to claim 9,
wherein in a case where the optical lens is viewed from the direction of the optical axis, an area of the first concave portion provided on the first surface of the flange portion is equal to or greater than 5% of an area of the flange portion and equal to or less than 18% thereof.

18. The optical lens according to claim 13,
wherein in a case where the optical lens is viewed from the direction of the optical axis, an area of the first concave portion provided on the first surface of the flange portion is equal to or greater than 5% of an area of the flange portion and equal to or less than 18% thereof.

* * * * *